United States Patent
Reatti

(10) Patent No.: US 6,561,340 B2
(45) Date of Patent: May 13, 2003

(54) ROLLERED WALL ELEMENT, PARTICULARLY FOR WALLS OF PRODUCT ACCUMULATION STATIONS

(75) Inventor: Rodolfo Reatti, Brivio (IT)

(73) Assignee: System Plast S.p.A., Telgate (IT)

( * ) Notice: Subject to any disclaimer, the term of this patent is extended or adjusted under 35 U.S.C. 154(b) by 0 days.

(21) Appl. No.: 09/925,779

(22) Filed: Aug. 9, 2001

(65) Prior Publication Data

US 2002/0046930 A1 Apr. 25, 2002

(30) Foreign Application Priority Data

Aug. 9, 2000 (IT) .......................................... MI20A1859

(51) Int. Cl.[7] .............................................. B65G 47/26
(52) U.S. Cl. ........................................ 198/454; 198/453
(58) Field of Search ................................ 198/453, 454, 198/452, 442, 836.1; 193/35 R

(56) References Cited

U.S. PATENT DOCUMENTS 4,962,843 A  * 10/1990 Ouellette ................ 198/454 X
5,143,200 A     9/1992 Fuller ......................... 198/453
5,160,014 A  * 11/1992 Khalar .................... 198/454 X
5,311,979 A  *  5/1994 Risley et al. ........... 198/454 X

FOREIGN PATENT DOCUMENTS

| EP | 0787666 | 8/1997 |
| EP | 0888985 | 1/1999 |
| EP | 0893373 | 1/1999 |
| EP | 0931737 | 7/1999 |

* cited by examiner

Primary Examiner—James R. Bidwell
(74) Attorney, Agent, or Firm—Steinberg & Raskin, P.C.

(57) ABSTRACT

The present invention relates to a modular wall system for accumulation stations for conveying lines for products having a plurality of first and second components so that each of the first components have a face defined by a plurality of rollers, each one of the first components being structured and arranged so that it is attachable to another first component in end to end abutment and also attachable to another first component in face to face abutment. Each of the second components is selectively attachable to a first component.

8 Claims, 5 Drawing Sheets

ROLLERED WALL ELEMENT, PARTICULARLY FOR WALLS OF PRODUCT ACCUMULATION STATIONS

FIELD OF THE INVENTION

The present invention relates to a wall element supporting a plurality of idle rollers, particularly for accumulation stations of conveying lines for products.

BACKGROUND OF THE INVENTION

In this particular sector of the art, rollered walls are known for delimiting the product path on one side (these walls are known as side walls), or for simultaneously delimiting two adjacent parallel paths (these walls are known as central walls). The two walls (side and central) are of different types, i.e. they are specific for their function, so that apart from the rollers and certain other components of minor importance, their main components differ from each other in the sense that they are interchangeable to only a small extent. This represents a considerable drawback both for the manufacturer and for the user (client); the former because he has to produce and stock a greater number of parts resulting in increased costs, and the latter because these increased costs negatively affect the price to be paid.

OBJECTS AND SUMMARY OF THE INVENTION

The main object of the invention is to provide elements for both lateral and central walls incorporating idle rollers which have a basic component in common. Another object of the present invention is to provide elements for side and central walls which are easily constructed and mounted. These and further objects which will be more apparent from the ensuing description.

BRIEF DESCRIPTION OF THE DRAWINGS

The invention will be better understood from the detailed description of a preferred embodiment thereof, given hereinafter by way of non-limiting example and illustrated in the accompanying drawings, in which.

DETAILED DESCRIPTION OF THE INVENTION

Figure 1:
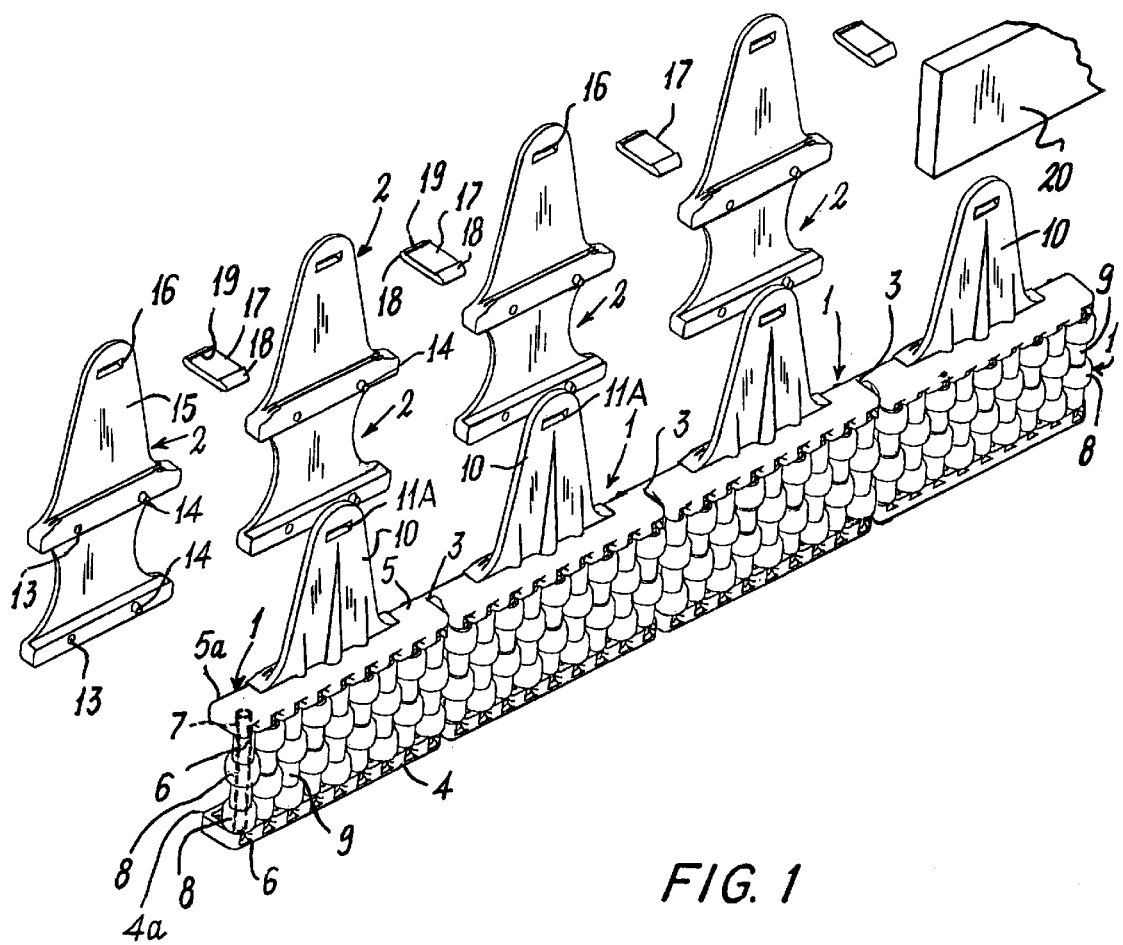
FIG. 1 is an exploded perspective view of a side wall.

Both the rollered side walls (indicated overall by A) and central walls (indicated overall by B) are formed from elements S which have a common basic component. This component common to the two types of wall is indicated overall by 1. The side wall A comprises a plurality of elements S presenting these "common" components 1 together with lateral components 2 which fit onto these "common" components 1 by male-female engagement. The central wall B is instead formed from a plurality of elements S presenting these "common" components 1, again fitted together by male/female engagement.

Specifically, the wall element S is formed either from two components 1 or from one component 1 plus one lateral component 2.

The wall elements S are advantageously joined together by mutual hinging, which can be achieved by pins and eyelets (in known manner).

To obtain wall sections formed from several elements (for example four as in the figures), connection bridges of reduced cross-section can be provided between one element S and the next, to provide a certain relative angular mobility between the elements.

In particular, with reference to FIGS. from 1 to 4, the wall element shown therein comprises the "common" component 1 formed from a base 4 and a head 5 obtained by moulding reinforced plastic material. In these there are provided laterally open seats 6 into which metal pins 7, on which rollers 8 are idly mounted with relative spacers 9 therebetween, can be inserted by slight forcing.

The head presents, integral therewith, a flange 10 extending upwards (during use) and comprising a rectangular aperture 11A in proximity to its free end.

The head 5 presents pins 11 on its face 5a, with matching dead holes 12 being provided in the face 4a of the base 4, to enable the outer component 2 to be coupled by male/female engagement. In corresponding positions the outer component 2 comprises dead holes 13 and pins 14 for coupling purposes. The outer component is also of reinforced plastic and presents a flange 15 provided with a rectangular aperture 16.

When the components 1 and 2 have been fitted together, the two flanges 10 and 15 are substantially parallel and the relative apertures 11A, 16 are aligned to enable tie bars 17 provided with end lead-ins 18 and steps 19 to be located, their purpose being to support the element of the invention on a conventional flat iron support 20.

Figure 2:
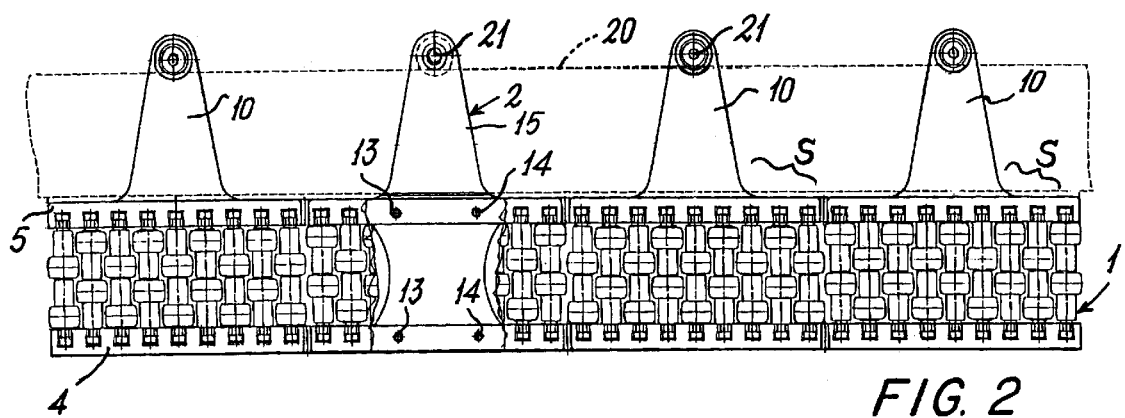
FIGS. 2, 3 and 4 show a side wall respectively in side elevation (with a part removed), in plan view and in cross-section (mounted on a support plate or bar)
Figure 3:
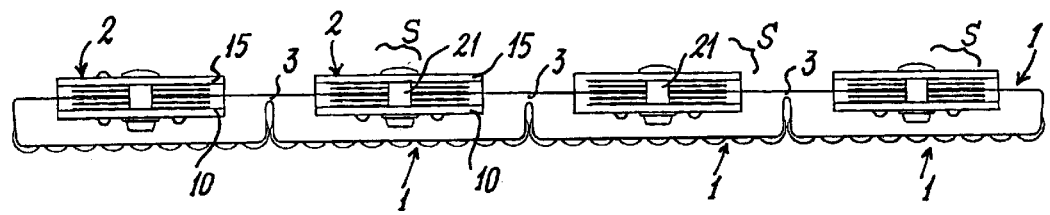
Figure 4:
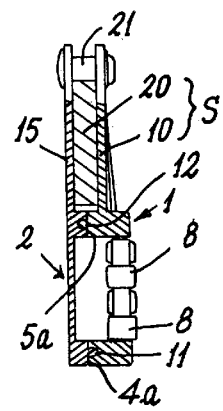
Figure 5:
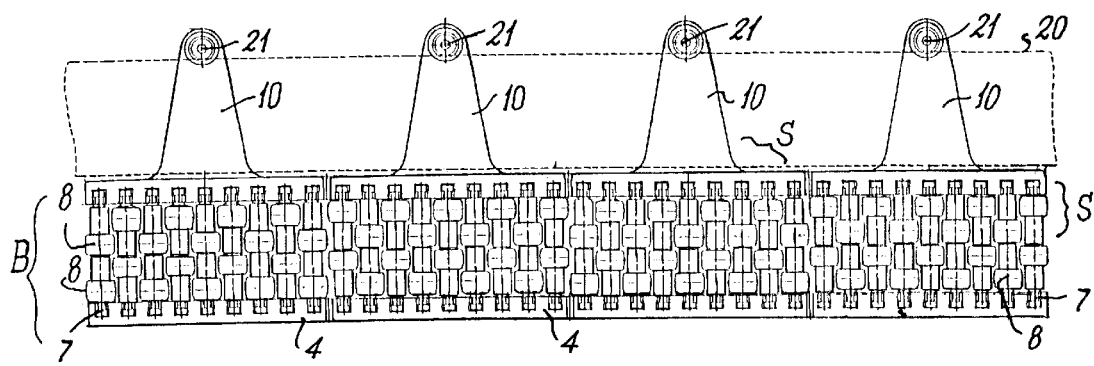
FIGS. 5, 6 and 7 show a central wall respectively in side elevation, in plan view and in cross-section (mounted on a support plate or bar)
Figure 6:
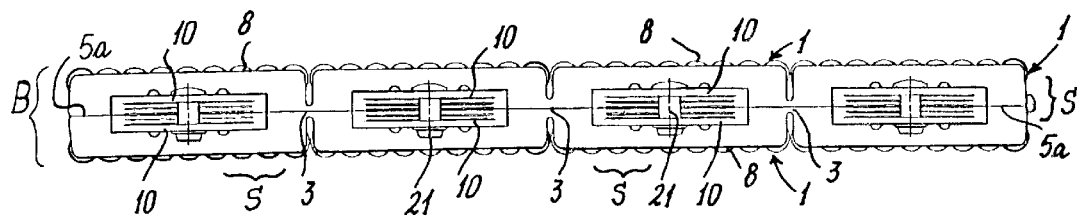
Figure 7:
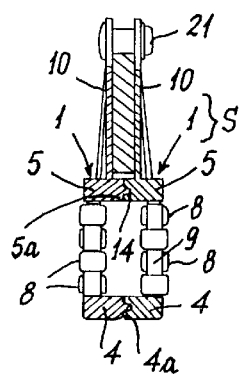
Figure 8:
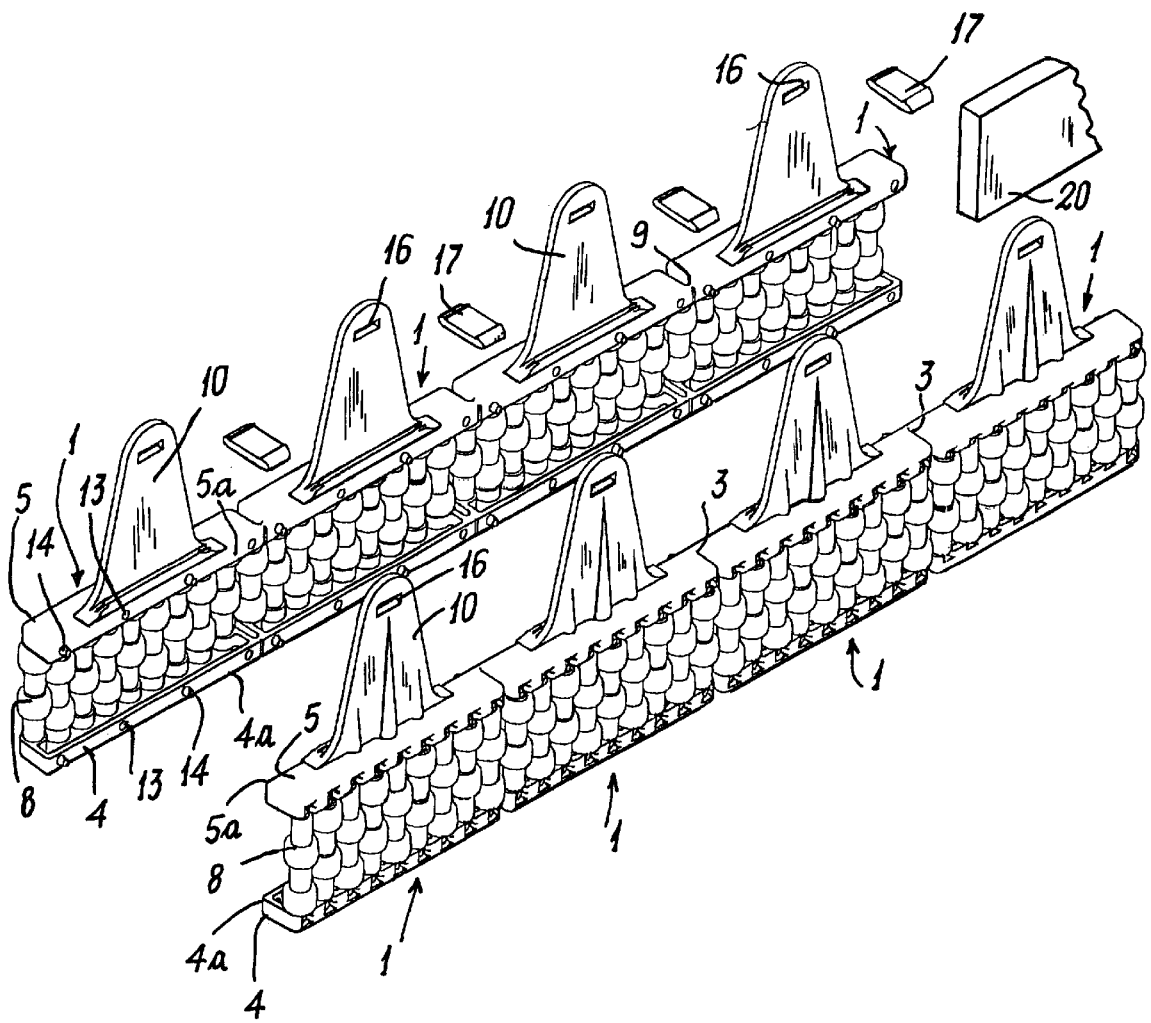
FIG. 8 is an exploded view of the central wall.

As can be seen from FIGS. 2–4, instead of the tie bars 17, pins 21 can be used passing through apertures shaped differently from the rectangular apertures 11A, 16 of FIG. 1.

Figure 9:
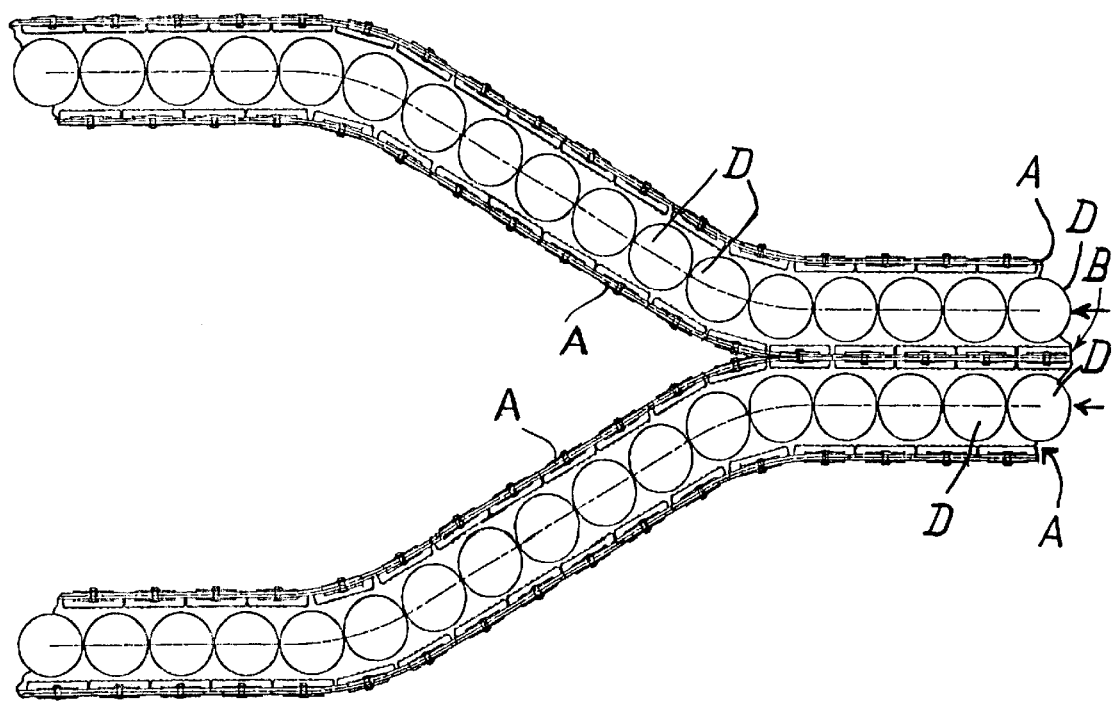
FIG. 9 is a schematic plan view of two lines which, starting side by side, then pass to a spaced-apart parallel arrangement, the two lines using both central and side wall elements.

As already stated, FIGS. from 5 to 8 refer to elements S intended to form a central wall B, common to two paths of articles or products, for example bottles D (FIG. 9). The element in question is formed by fitting together two components both identical to the "common" component 1 already described in relation to the side wall (of FIGS. 1–4). In practice the component 2 is here replaced by a component 1, so that the sliding rollers lie on both sides of the resultant wall. With the central wall element S, its two "common" components 1 are again fitted together by matching pins and holes 13, 14 present on the contacting faces of the two components 1. For the remainder, that already stated in relation to FIGS. from 1 to 4 is valid.

The advantages of the invention are apparent from the a foregoing detailed description, these deriving from the fact that one main component (that indicated by 1) can be used to form both side walls and central walls, with a reduction in the number of components and a saving in costs. In the central wall the element S consists of the combination of two identical components (i.e. those indicated by 1) whereas in the side wall the component 1 is coupled to a different component, i.e. that indicated by 2.

To further stabilize the engagement between the constituent components of the element of the invention, they can be glued or be bonded together, for example by ultrasonic bonding.

Details relating to the snap-fitting of the pins 7 into the bases 4 and heads 5 can be found in U.S. patent application Ser. No. 09/925,771, filed on Aug. 9, 2001, which was filed by the present applicant.

I claim:

1. A modular wall system comprising:

a plurality of first components, each of said first components having a face defined by a plurality of rollers, each one of said first components being structured and arranged so that it is attachable to another first component in end to end abutment and also attachable to another first component in face to face abutment;

a plurality of second components, each of said second components being selectively attachable to a first component;

means for coupling one of said second components to a respective one of said first components and for coupling one of said first components to another one of said first components in face to face abutment;

whereby a wall having rollers on each lateral side of said wall is constructed by attaching a first plurality of said first components in end to end abutment and attaching a second plurality of said first components to said first plurality of first components in face to face abutment; and whereby a wall having rollers on only one lateral side of said wall is constructed by attaching a plurality of said first components in end wall to end wall abutment and attaching a plurality of said second components to said plurality of said first components.

2. A modular wall system as claimed in claim 1, wherein each one of the first components includes end supports and each of said second components is attachable to said end supports.

3. A modular wall system as claimed in claim 1, wherein each one of the first and second components each have a flange such that when one of said first components is coupled to one of said second components the flanges form a fork through which a flat support element passes and a tie bar is mounted between the flanges.

4. A modular wall system as claimed in claim 1, wherein each one of said first components is attachable to another one of said first components by means of a hinge connection.

5. A modular wall system as claimed in claim 1, wherein said means for coupling is a male and female connection.

6. A modular wall system as claimed in claim 1, wherein the means for coupling is provided on a side of the end supports.

7. A modular wall system as claimed in claim 1, wherein the means for coupling comprises at least one male coupling member structured and arranged to engage at least one female coupling member.

8. A modular wall system as claimed in claim 1, wherein each one of the first components has a flange such that when one of said first components is coupled to another one of said first components the flanges form a fork through which a flat support element passes and a tie bar is mounted between the flanges.

\* \* \* \* \*

UNITED STATES PATENT AND TRADEMARK OFFICE
CERTIFICATE OF CORRECTION

PATENT NO. : 6,561,340 B2
DATED : May 13, 2003
INVENTOR(S) : Rodolfo Reatti

It is certified that error appears in the above-identified patent and that said Letters Patent is hereby corrected as shown below:

<u>Title page,</u>
Item [30], Foreign Application Priority Data, should read -- MI2000 A 001859 --

Signed and Sealed this

Second Day of September, 2003

JAMES E. ROGAN
*Director of the United States Patent and Trademark Office*